United States Patent [19]

Nonnenmann et al.

[11] 4,270,641
[45] Jun. 2, 1981

[54] FLUID-FILLED FRICTION CLUTCH

[75] Inventors: Manfred Nonnenmann, Schwieberdingen; Werner Hummel, Waiblingen, both of Fed. Rep. of Germany

[73] Assignee: Süddeutsche Kühlerfabrik Julius Fr. Behr GmbH & Co. KG, Stuttgart, Fed. Rep. of Germany

[21] Appl. No.: 7,792

[22] Filed: Jan. 30, 1979

[30] Foreign Application Priority Data

Feb. 4, 1978 [DE] Fed. Rep. of Germany ....... 2804859

[51] Int. Cl.³ ...................... F16D 27/01; F16D 27/10; F16D 35/00
[52] U.S. Cl. ................................ 192/82 T; 192/58 B; 192/84 PM
[58] Field of Search .............. 192/82 T, 84 PM, 58 B, 192/84 R, 90; 251/65

[56] References Cited

U.S. PATENT DOCUMENTS

| | | | |
|---|---|---|---|
| 2,838,244 | 6/1958 | Oldberg | 192/82 T |
| 3,179,221 | 4/1965 | Weir | 192/58 B |
| 3,207,279 | 9/1965 | Ahlen | 192/48.2 X |
| 3,250,355 | 5/1966 | Weir | 192/58 B |
| 3,738,578 | 6/1973 | Farrell | 251/65 X |
| 3,880,265 | 4/1975 | Elmer | 192/58 B |
| 4,056,178 | 11/1977 | Detty | 192/82 T X |

FOREIGN PATENT DOCUMENTS

| | | | |
|---|---|---|---|
| 1270339 | 6/1968 | Fed. Rep. of Germany . | |
| 1284186 | 7/1969 | Fed. Rep. of Germany . | |
| 2364234 | 7/1975 | Fed. Rep. of Germany | 192/58 B |

*Primary Examiner*—Rodney H. Bonck
*Attorney, Agent, or Firm*—Browdy and Neimark

[57] ABSTRACT

A fluid friction clutch, especially for driving the cooling fan of an internal combustion engine. The rotating clutch housing has a separating wall defining a fluid reservoir chamber and a drive chamber and the separating wall has a passage which is opened and closed by a valve. The valve is actuated by an electromagnet disposed substantially coaxially with the clutch. A permanent magnet is attached to the valve assembly coaxially with the electromagnet and of opposite polarity to the magnetic field polarity which occurs when the electromagnet is energized. Upon energization, the opposing magnetic fields repel the two magnets and cause the valve to close, thereby disengaging the clutch. When the electromagnetic is deenergized, a spring reopens the valve and permits full engagement of the clutch.

3 Claims, 3 Drawing Figures

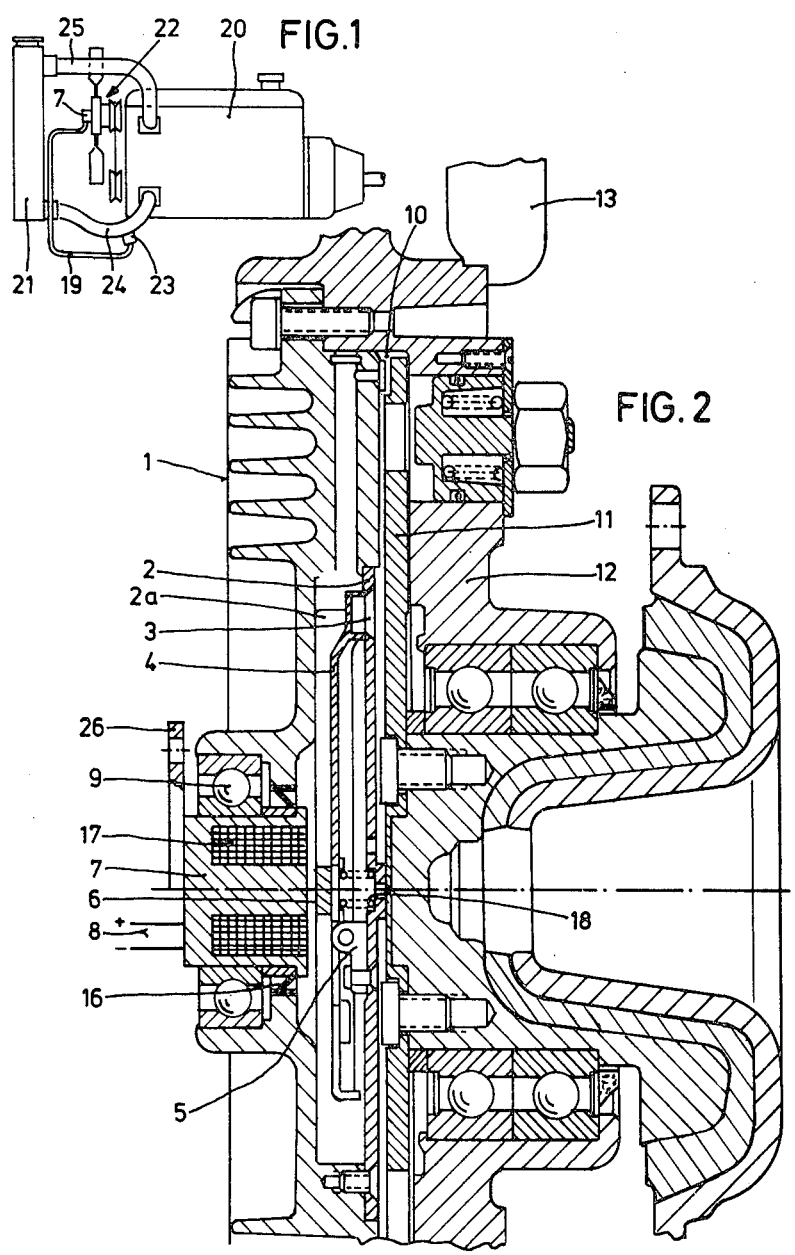

FLUID-FILLED FRICTION CLUTCH

FIELD OF THE INVENTION

The invention relates to fluid-filled friction clutches, especially for driving cooling fans of an internal combustion engine. The actuation of the clutch takes place under the control of temperature-dependent switches which act upon actuators associated with the clutch.

BACKGROUND OF THE INVENTION

It is known in the art to adapt the speed of a cooling fan in an internal combustion engine to the required cooling power by means of a controllable clutch. The clutches are preferably fluid-filled friction clutches in which the degree of fluid filling is variable and which have a housing that is rotatable with respect to the drive assembly. The housing has a separating wall which defines a drive chamber and a fluid storage chamber and the drive chamber houses the drive disc. The separating wall between the two chambers has an opening that can be variably opened and closed by a valve assembly for the purpose of controlling the degree of fluid filling of the clutch. Clutches commonly in use employ a bimetallic element or an expansion element for actuating the valve. The valve-actuating forces are transmitted thereto by a piston or other mechanical linkage.

The clutch which carries the fan blades is located in the air stream that has passed through the engine radiator. Accordingly, the temperature-sensitive element in the clutch controls the operation of the clutch on the basis of the cooling air temperature which represents the coolant temperature.

A fluid coupling of this type is described, for example, in the German Pat. No. 1 284 186.

In recent times, engine designs have included the disposition of a separate radiator for cooling the supercharged air and locating this radiator ahead of the main water radiator. The modern designs also include the use of annular radiators having radial blowers, fans located in front of the radiators and blowers for air-cooled engines. In all of these special designs, the simple fluid friction coupling described is not applicable.

This is due to the fact that, in the first instance, the cooling air is additionally heated by passage through the super-charged air radiator and, in the other cases, the air is heated up only after passing through the fan. Accordingly, the variable clutch must be so constructed as to be controllable by the temperature of the engine coolant or some engine component and a control signal must be generated by a suitable thermal switch and transmitted to the clutch.

The medium for transmitting the signal may be compressed air, or electrical current. For example, a pneumatic control is known from U.S. Pat. No. 3,880,265. However, pneumatic and hydraulic control systems are expensive and require heavy and complicated conduits. The electrical signal transmission is substantially less expensive.

The requirement for rapid response of a fan clutch to temperature changes is admirably met by an electromagnetic control which receives its actuating signal from a thermal switch disposed at some critical location of the engine. Solenoid controls for fluid friction clutches are known for example from the German Auslegeschrift No. 1 270 339.

This publication describes a fluid clutch in which an electromagnet displaces an element out of the drive chamber, permitting the latter to be filled with oil. The annular electromagnet is stationary and is located in front of the clutch. Accordingly, a relatively great distance has to be provided between the clutch and the magnet to account for construction differences and oscillations. A further disadvantage of the known apparatus is that the magnet must be quite powerful so as to be able to move the displacement element against the force of a required return spring. Thus, the magnet involves a substantial expense and large weight and requires heavy electrical current. This latter property is especially disadvantageous because the operational safety requires that the clutch should engage when the electrical current fails. It is known that a fan coupling for motor vehicles is needed only during approximately 5% of the entire operation of the vehicle whereas, during the remaining 95%, the fan is disengaged, requiring that the electromagnet be powered. Accordingly, the energy consumption is substantial during most of the vehicle operation.

OBJECT OF THE INVENTION

It is thus a principal object of the present invention to provide a fluid-filled friction clutch with electrically controlled electromagnetic actuation. It is a further object of the invention to provide electromagnetic actuation with a solenoid of low power and relatively low weight which provides reliable control of the clutch actuation. It is a still further object of the invention to provide a clutch which engages when the electrical power fails. Still another object of the invention is to provide an electromagnetically controlled clutch which operates without the use of commutator slip rings.

These and other objects are attained according to the invention by providing a fluid friction coupling in which a valve opens and closes the passage in the separating wall between the drive chamber and the fluid reservoir and wherein the electromagnetic assembly that actuates the valve includes a permanent magnet so disposed that its polarity is axially opposite the polarity of an electromagnet disposed coaxially therewith. A further feature of the invention is that the shortest distance between the two magnets is limited by limiting the displacement of the valve lever with a stop.

The D.C. powered electromagnet is disposed in relative rotation with respect to the clutch housing. When the electromagnet is supplied with power, the force of repulsion between the magnets causes the valve to close the passage in the separating wall, thereby disengaging the clutch. When the electrical current to the solenoid is reduced or eliminated, a spring opens the valve, permitting the clutch to fill with oil and thereby engaging the drive shaft, resulting in maximum rotational speed.

The combination of an electromagnet and a permanent magnet according to the present invention makes possible a contact-free transmission of force to the valve lever which rotates relative to the electromagnet. This feature substantially simplifies the construction of the control mechanism and the operational reliability. By locating the electromagnet in the clutch housing, the air gap between the two magnets can be made very small so that a relatively low magnetic field strength is sufficient, permitting the size of the electromagnet to be relatively small, which has favorable results with respect to constructional costs, bearing loads and current consumption. The opening displacement of the valve lever may be limited by its coming into contact with the clutch housing or the separating wall.

A favorable feature of the invention is to seal the oil storage chamber with respect to the electromagnet by a non-magnetizable plate of low thickness.

If the sealing requirements are somewhat less, it is a further feature of the invention that the oil seal is provided by a sliding ring seal disposed between the rotating clutch housing and the stationary electromagnet.

Other characteristics and advantages of the invention will be described in connection with the drawing which illustrates a preferred exemplary embodiment.

DESCRIPTION OF THE DRAWING

FIG. 1 is a schematic illustration of an internal combustion engine with a cooling system and cooling fan;

FIG. 2 is a partial axial section of a fluid friction coupling according to the invention.

DESCRIPTION OF THE PREFERRED EMBODIMENTS

Figure 3:
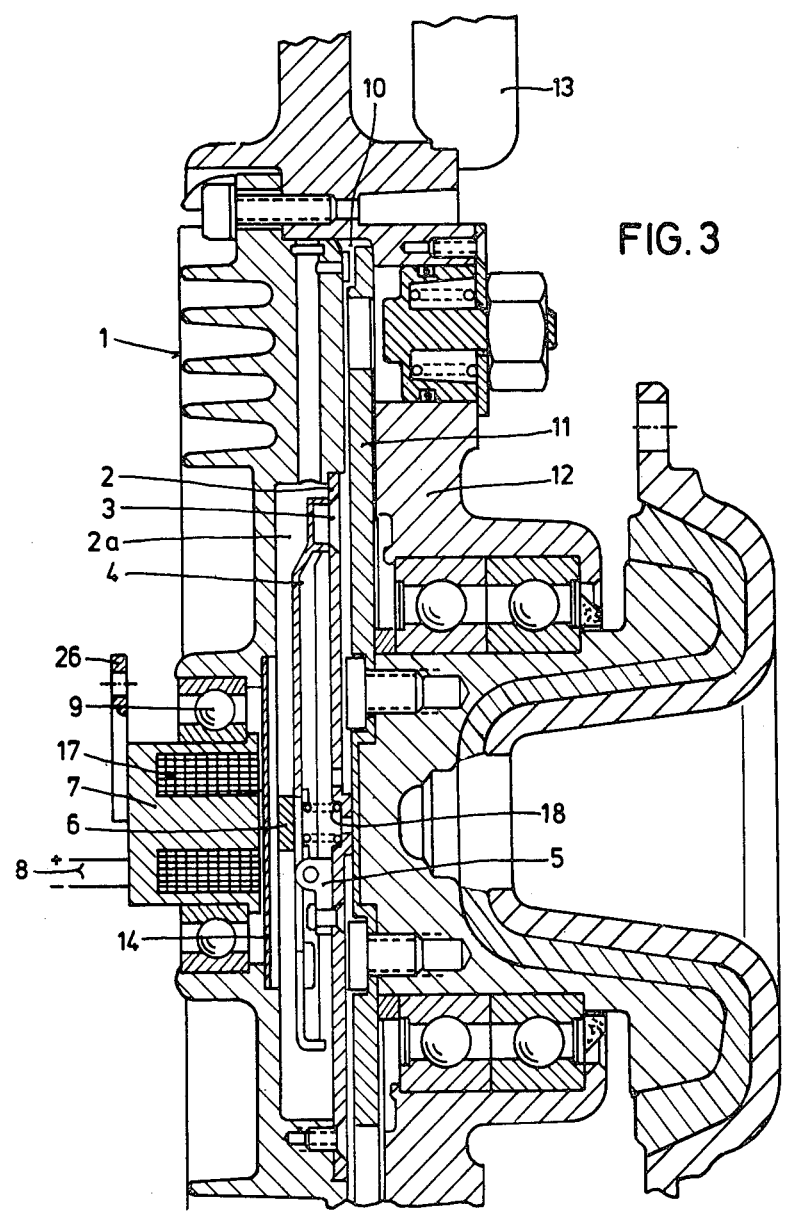
FIG. 3 is a sectional view of a variant of the invention in which a sealing plate is located between the electromagnet and the storage chamber.

FIG. 1 is a schematic illustration of an internal combustion engine 20 having a cooling system with a fan that employs a fluid-filled friction clutch according to the invention. The internal combustion engine 20 is connected to a radiator 21 via coolant lines 24 and 25. Disposed behind the radiator and ahead of the engine is a fan 22 equipped with a fluid friction clutch according to the invention which is driven in per se known manner from the crankshaft of the engine. In the exemplary embodiment illustrated, a thermal switch 23 is located in the coolant return line 24 so as to generate an electrical signal that controls the actuation of the fluid friction clutch. Further shown in FIG. 1 is an electromagnet 7 which serves to control the operation of the fluid friction clutch and which is powered through electrical lines 19 by the thermal switch 23.

FIG. 2 is a detailed illustration of a fluid friction clutch according to the invention.

The clutch includes a frontal housing 1 on which fan blades 13 are fastened or are integral therewith. A separating wall 2 separates the interior of the clutch into a storage chamber 2a and a drive chamber 10. The clutch is provided with a rear wall 12. Located within the drive chamber 10 is a drive disc 11. The separating wall 2 has an oil passage 3 leading to the drive chamber 10 and this passage may be opened and closed by a valve, for example a valve lever 4, which pivots in a pivot 5 and which is moved by an electromagnet 7 having a coil 15 which is powered with direct current by electrical lines 8 and which is disposed coaxially with the clutch in the vicinity of the storage chamber 2a in a manner permitting relative rotation with respect to the clutch housing. According to the invention, a permanent magnet 6, for example a disc-shaped magnet, is disposed on the valve lever 4 in such a manner that its polarity is opposite to the polarity occurring when the electromagnet is energized. Accordingly, when the electromagnet 7 is energized via the thermal swtich 23, the magnets 7 and 6 repel one another. Inasmuch as the electromagnet 7 is axially fixed with respect to the clutch housing, for example by means of a support 26, the repulsive forces push the valve lever 4 away from the electromagnet 7, thereby tending to close the oil passage 3 so that the clutch is disengaged. When the electromagnet 7 is deenergized, the valve reopens due to the force exerted by the compression spring 18, thereby permitting the clutch to fill with oil and causing the fan to rotate at maximum speed.

The storage chamber 2a is sealed with respect to the electromagnet 7, for example as shown in FIG. 3, by a plate 14 made of non-magnetizable material and having relatively low thickness.

If the degree of sealing which is required is not critical, it is also possible to dispose a sealing ring 16 between the rotating clutch housing 1 and the stationary electromagnet 7, as shown in FIG. 2. The actuation of the electromagnet 7 is under the control of a thermal switch 23 which is located, as shown in FIG. 1, in the coolant return line 24. The thermal switch 23 may also be exposed to the engine charging air or to an engine lubricant, the cylinder walls and the like, i.e., at some point which is in thermal communication with a particular engine member or fluid.

The construction of the clutch according to the invention is such that, when the electric current which powers the electromagnet fails, the spring 18 moves the valve lever 4 away from the separating wall, tending to open the passage 3 which permits the clutch to engage and the fan to rotate at maximum speed.

In another feature of the invention, as illustrated in FIG. 2, the electromagnet 7 extends into the storage chamber 2a and is held in the clutch housing 1 by a rotatable bearing 9.

The invention is not limited to the embodiments described hereinabove. It is to be noted especially that the contruction of the fluid friction coupling may be different from that used to illustrate the exemplary embodiments. It is substantial only that the actuation of the valve which controls the flow of oil through a passage 3 in a separating wall between a storage chamber and a drive chamber is performed by an electromagnet 7 in combination with a permanent magnet 6.

Furthermore, the invention includes any variants and constructions within the province of a person skilled in the art as well as any partial or sub-combinations of the characteristics and methods described or illustrated, all within the scope of the invention.

We claim:

1. A fluid friction clutch, especially for driving the cooling fan of an internal combustion engine, said friction clutch having a frontal portion and including rotary drive means, a housing disposed coaxially with said drive means and capable of relative rotation therewith, said housing having a separating wall which defines a drive chamber and a fluid reservoir chamber, said rotary drive means being provided with a drive disc located in said drive chamber, and wherein said separating wall has a passage which provides communication between said drive chamber and said fluid reservoir chamber, and said clutch further includes a valve assembly for opening and closing said passage and a D.C. powered stationary electromagnet for actuating said valve assembly under the control of a thermal switch, the improvement wherein said stationary electromagnet is disposed in said frontal portion of said clutch, said valve assembly includes a valve lever, and further comprising a permanent magnet, disposed coaxially to the clutch and on top of said valve lever, the polarity of said permanent magnet being opposite to the polarity of the field established by said electromagnet when energized, resulting in relative magnetic repulsion of said electromagnet and said permanent magnet moving said valve to its valve-closed position and turning off the clutch, the minimum distance between said electromagnet and said permanent magnet being limited by a stop which limits the displacement of said valve assembly.

2. A fluid friction clutch according to claim 1, further comprising a sealing plate between said electromagnet and said permanent magnet for preventing the passage of oil out of said reservoir chamber.

3. A fluid friction clutch according to claim 1, wherein said electromagnet extends into said fluid reservoir chamber and wherein sealing means are provided to seal said electromagnet with respect to said housing.

* * * * *